United States Patent [19]

Green

[11] Patent Number: 4,519,036
[45] Date of Patent: May 21, 1985

[54] PROGRAM STORAGE HARDWARE WITH SECURITY SCHEME

[75] Inventor: Ian M. Green, Buckie, Scotland

[73] Assignee: EMI Limited, Hayes, England

[21] Appl. No.: 455,738

[22] Filed: Jan. 5, 1983

[51] Int. Cl.³ .............................................. G06F 1/00
[52] U.S. Cl. .................................................... 364/200
[58] Field of Search ... 364/200 MS File, 900 MS File

[56] References Cited

U.S. PATENT DOCUMENTS 4,139,893 2/1979 Poland .............................. 364/200

FOREIGN PATENT DOCUMENTS

WO81/02480 9/1981 PCT Int'l Appl. .

Primary Examiner—Raulfe B. Zache
Attorney, Agent, or Firm—Fleit, Jacobson, Cohn & Price

[57] ABSTRACT

A computer generally includes a program storage device for storage in memory of program or other information. The software or program may be expensive to produce yet can be copied without undue difficulty from the storage device.

This invention provides a program storage device which does not output an address, as part of an instruction, if it is an address within the device. The data output from a programmable read only memory (PROM) is output to a data modifier where in response to a controller it is changed to a dummy address for output. Information to reconstitute the address is held in a stack then when the dummy address returns the controller causes an offset adder to return the original address. Steps can be taken to deal appropriately with conditional instructions and relative instructions.

17 Claims, 1 Drawing Figure

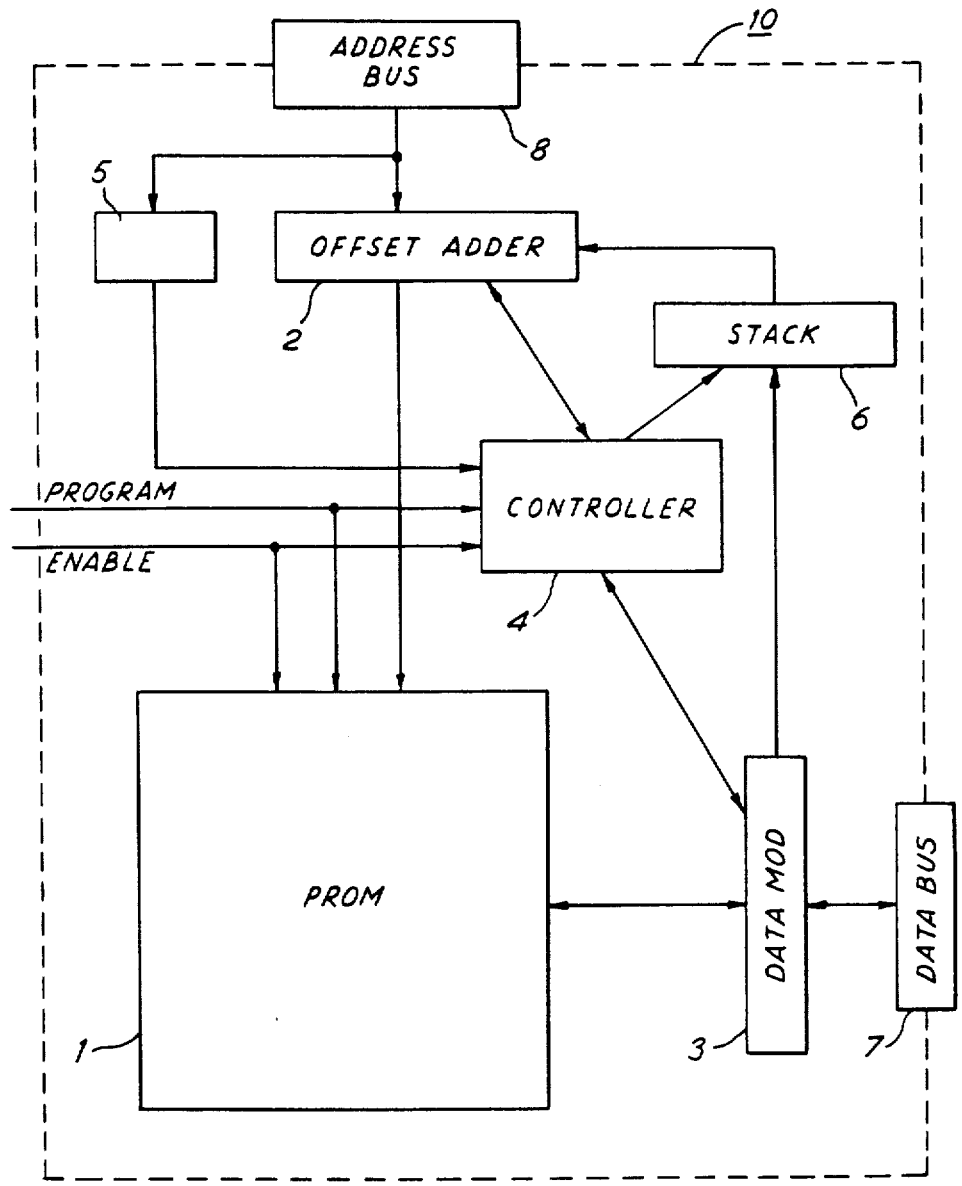

PROGRAM STORAGE HARDWARE WITH SECURITY SCHEME

This invention relates to program storage devices and especially although not exclusively to, read-only memory (ROM) devices. The invention particularly relates to such devices for use with computers, the word computer being broadly interpreted as electronic circuits operative in response to a predetermined stored program for computation or control or the like.

Frequently, the development of a program or other information, for storage in memory devices, and subsequent marketing incurs considerable cost. Obviously, unauthorised access to the device contents allows copying and consequent diminution of the market value of the memory device. Simple listing of the program device contents by incrementing the address bus thereof may be obviated by utilization of a sequence of legal access steps. Nevertheless, techniques have been devised by means of which it is possible to derive, from such a ROM device, information as to its contents.

It is an object of this invention to provide an improved program storage device featuring greater security of the device contents, whilst maintaining conventional techniques of both device usage and programming.

According to one aspect of the invention there is provided a program storage device for a computer, the device including means capable of falsifying output data and further including complementary systems capable, in response to false inputs occuring as a consequence of said false output data, of correcting said false inputs.

In a preferred embodiment the program storage device contains an addressed array that may hold data and the known inaccuracy may be created in output program data contents including references to addresses. Furthermore, the inaccuracy may be created in the referenced address, to replace it with a dummy address, which inaccuracy is corrected when said dummy address is accessed.

In a sequence of instructions stored at addresses in a program storage device, referals between different addresses is a common occurrence. If simple listing of the sequence within the storage device and hence the address contents is eliminated, then study by an external operator, of the instructions in operation, may indirectly reveal the contents of the devices addresses. However, by making it appear to the external operator that referals to addresses are in fact referals to a single address, little information about the sequence of instructions may be gleaned by external study.

Consequently all call addresses and jump addresses appearing in the output program data sequence are made inaccurate by replacement with a dummy address. The difference or offset between the actual call or jump address and the dummy address is retained and subsequently added to the dummy address when the device is accessed at the dummy address. It is apparent that utilization of the stored sequence in the device should appear to be standard to a device user.

For a better understanding of the invention and to show how it may be carried into effect, reference will now be made by way of example only, to the accompanying drawing, the single FIGURE of which illustrates a program storage device of the invention.

A program storage device 10 comprises a programmable read-only memory (PROM) section 1 connected through a data modifier 3 to a data bus 7. A sequence decoder and controller 4 monitors the sequence of data from the PROM section to the modifier and may cause the modifier to act on the data as required. If for example a jump to address xxxx is to form part of the program data sequence relayed from the PROM section, then the controller 4 detects this and causes modifier 3 to replace address xxxx with a dummy address DDDD before the data sequence appears at data bus 7. The offset, being the difference between xxxx and DDDD, is relayed to an offset stack 6.

When a processing unit (not shown), for example a Z80 manufactured by Zilog Inc., California, acts on that part of the sequence instructing it to jump to address DDDD, dummy address DDDD appears at an address bus 8 of the device 10. This address is relayed to an offset address adder 2 connected to controller 4, which monitors for the dummy address. When this dummy address appears, the controller causes offset stack 6 to transfer the contents at the bottom of the stack to the adder 2. Addition of this value to the dummy address recovers the actual address required, xxxx. The actual address is subsequently relayed to the PROM section, where the contents of that address proceed towards the output bus 7.

In operation the device 10 may initially be user programmed, verified and erased except for an address at the top of the PROM section 1, which is allocated as a control word. All routines within the PROM section are arranged by the user to be able to be called by an external source only through access to a jump table located at the bottom addresses of the PROM section. This table consists of a number of, jump directly to address xxxx statements, and the table may for example hold up to 32 instructions. Utilization of such tables is good programming practice and the requirement for this table encourages better programming techniques.

Typically an area near the top of the PROM section is designated free PROM, which may be accessed directly and may hold tables or messages as required. A section 5 acts as an address decoder, to sense if the external source is requesting access to this free PROM area.

Conventional programming and chip enable contact is maintained between the processing unit, the controller 4 and the PROM section 1. The program storage device 10 is thus compatible with a simple PROM device and is substantially indistinguishable from such a device to the processing unit.

It is arranged that when programming of the PROM section is complete, the least significant bit of the control word mentioned herein above may be programmed, resulting in a fusible link within the controller 4 breaking, initiating it to modify data as described hereinabove. Consequently verification of the stored program data is prohibited. Furthermore if further verification is attempted the controller is arranged to alter the data bus to output all '1's. Therefore the device may be accessed only within the jump table, the designated free PROM area or naturally as determined by the output data sequence. This will normally be at the address one above the last access address. Clearly multiple accesses of the same address are also allowed.

Therefore, when an address within the jump table is accessed, the jump to address xxxx statement is made incorrect by replacement with address DDDD before the statement arrives at the data bus 7. The offset between xxxx and DDDD is retained and added back to the address DDDD when it appears at address bus 8. Consequently to a person studying the device 10, all instructions within the jump table have as their address destination, address DDDD. It will be apparent that many forms of dummy addressing may be utilized. In addition random jumps to address DDDD may be added between valid program code.

To illustrate further the embodiment described hereinbefore, the operation of the device for a number of instruction statements will be illustrated. When a direct absolute jump statement appears within the output from PROM section 1, the controller detects the characteristic code command for a direct absolute jump statement and examines the destination address to check for its location within the device 10. If it is located therein then the dummy address is substituted for the destination address and the offset evaluated and later added to the dummy address by address adder 2 when the dummy address appears at the address bus 8; the correct destination address proceeding through to the PROM section 1. If the address destination is external to the device 10, then when the dummy address is accessed the correct address is again calculated, but in this instance the controller 4 substitutes a direct absolute jump characteristic code followed by the correct address, which is relayed to data bus 7. It will be apparent that a slight delay is incurred for external jumps, resulting from this extra instruction.

A conditional absolute jump statement produces an absolute jump that is conditional on an external flag being set. Again, the controller detects the characteristic code command, substitutes the dummy address for the correct destination address and calculates the offset. Subsequently the controller monitors address accesses at the address bus 8. When the external condition is met, the following access will be to the dummy address and the offset is therefore added to recover the correct destination address as hereinabove. However, should the next address accessed be the previous access address plus one, which is allowable, then the condition has clearly not been met and the offset is discarded, since the conditional absolute jump statement will recur as required. It will be apparent to those skilled in the art, the sequence of events that is followed when the destination address is either internal to device 10 or external to device 10.

In the case of a direct relative jump wherein the destination address of the jump is the present address +xx where xx is +128, the problem arises that the dummy address may be located more than 128 addresses from the present address. Consequently when a direct relative jump characteristic code command is monitored by the controller in PROM section output, it replaces, the code with that for a direct absolute jump and the destination address with the dummy address. The offset is evaluated from the difference between, the original present address plus the relative jump xx, and the dummy address. The offset is added to the dummy address when it is accessed in order that the correct destination address is relayed to the PROM section. Naturally a slight delay results from this method of treating direct relative jumps since the original two byte instruction has been replaced with a three byte one.

A further instruction type is a conditional relative jump statement, which follows the direct relative jump procedure outlined above, only when an external condition is met. When the controller, monitoring PROM section output, detects the characteristic code command of the conditional relative jump, it replaces the command with a conditional absolute jump having a destination address located at the dummy address, and employs the procedure appropriate to that command. The offset, it is clear, will be calculated according to the method outlined for direct relative jumps. Clearly a problem may arise if the external condition is not met, that is to say, if the following access address is not the dummy address, because a two byte instruction has been replaced with a three byte one. Consequently, the processor program counter will have advanced by one too many, necessitating the offset address to be decremented.

An absolute call statement, to call a routine at an address xxxx is treated in a similar manner to a direct absolute jump statement—the call address is replaced with the dummy address and an offset evaluated accordingly. It will be apparent that if dummy addresses are already in use, the respective offsets must not be lost. They are therefore stored in the offset stack 6 to be recalled in due course when a return command appears. This procedure allows multiple calls within calls to be handled, limited only by the length of the stack. In the event that the address referred to by the call command is located outside the device 10, the offsets stored remain unchanged until the return command of the call routine appears.

The treatment of a conditional call statement is analagous to that for conditional jumps. The conditional call is replaced with an absolute call to a dummy address, the command is only utilized if the controller monitors the next access at the dummy address, that is to say, the condition has been met.

The processor may be interrupted, and execute completely different procedures, for example calling routines. Provided the interrupt command exits by a return instruction the correct offset is maintained, since when the device is accessed via the jump table, the existing offset is stored on the stack. Similarly, it is important to employ the jump table for the statement type, "jump to an address defined by the contents of a register", otherwise access will be denied by the controller as illegal. It will be apparent that the jump may be handled as disclosed hereinbefore.

A further statement type involves a relative jump by x when a decrement register becomes zero. The controller may handle this by replacing the jump by x, with a zero jump. Clearly monitoring of the following access address indicates whether the decrement register is zero. When it is, the actual jump may dealt with in the same way as a relative jump above. Similarly a conditional return statement may be replaced with a conditional jump to address DDDD. If the next access is to the dummy address, a return statement is supplied by the controller and the correct offset evaluated from the stack contents.

Naturally the controller must on occasions respond very rapidly. Do nothing instructions may be inserted as required to increase available time for response, however the offsets must be decremented. The device of the invention should run at approximately processor speeds and may require very slight variations in programming techniques which will be apparent, in the specific circumstances in which they occur, to those skilled in the art. It will be apparent that the preferred program storage device should be constructed as a single chip, thereby preventing access to the transfer routes between the data modifier and its associated components, and the offset adder and its associated components.

As mentioned hereinbefore, in normal program operation the device will be indistinguishable from a simple PROM. However a program stored within a program storage device of the invention will therefore appear as a large series of segments starting from the dummy address, thereby safeguarding the contents against copying and use in alternative equipment.

Furthermore since the controller monitors the sequence of instructions received, the device can detect attempts to read the program stored therein as opposed to simply running it. Defensive steps such as the output of all 1's may be taken in response to detection of such attempts.

It will be understood that the embodiment illustrated shows an application of the invention in one form only for the purposes of illustration. In practice the invention may be applied to many different configurations, the detailed embodiments being straightforward for those skilled in the art to implement.

What we claim is:

1. A program storage device for a computer, the device including means capable of falsifying output data and further including complementary systems capable, in response to false inputs occuring as a consequence of said false output data, of correcting said false inputs.

2. A device according to claim 1 which includes an addressed array adapted to hold data and to output, as required, data including references to addresses, wherein the means capable of falsifying output data is adapted to create a predetermined inaccuracy in at least some of said references to addresses.

3. A device according to claim 2 wherein said complementary systems are adapted to operate on false inputs including said references to addresses to remove said predetermined inaccuracy.

4. A device according to claim 2 wherein the means capable of falsifying output data is adapted to operate in response to a referenced address to replace it with a dummy address and the complementary systems are adapted in response to the dummy address to correct it to the last referenced correct address.

5. A device according to claim 4 in which the same dummy address is used irrespective of the identity of the referenced address.

6. A device according to claim 4 including a supplementary system adapted to hold an offset derived from the difference between the dummy address and the referenced address and to provide said offset to the complementary circuits when required for correction.

7. A device according to claim 6 in which the supplementary system includes an offset stack.

8. A device according to claim 6 in which the complementary circuits are adapted to combine the dummy address portion of the false input with the respective offset to recover the respective referenced address.

9. A device according to claim 6 in which the means capable of falsifying output data is adapted to distinguish between absolute and conditional instructions and to cooperate with the complementary circuits to discard the offset if the condition is not satisfied.

10. A device according to claim 4 in which the output data includes the referenced address in the form of an address relative to another address wherein the means capable of falsifying the output data is adapted to provide the said dummy address identified as an absolute address and to cooperate using the complementary circuits so that the correct destination address is derived from the dummy address.

11. A device according to claim 4 in which the means capable of falsifying output data is adapted to distinguish between addresses within the device itself and addresses external thereto and to falsify only the addresses within the device.

12. A program storage device for a computer, the device including an addressed array adapted to hold data and output, as required, data including referenced addresses and circuits adapted to act on received instructions including those of said addresses which are within the device, wherein the device includes means for changing the referenced addresses, in the output data, which are within the device to a dummy address and means for retaining information about said change and for correctly interpreting the dummy addresses in received instructions in terms of the referenced addresses.

13. A program storage device for a computer, the device including a read only memory, a data bus adapted to receive and transmit output data from the read only memory, a sequence decoder and controller adapted to monitor the output of the read only memory, a modifier adapted to operate on the said output prior to receipt by the data bus in response to instruction from the decoder and controller to replace selected addresses included therein with a dummy address, an offset stack adapted to retain and output as required an offset derived from the difference between the dummy address and a respective selected address, an address bus adapted to receive addresses included in instructions to the device, and an offset adder circuit adapted to receive the offset from the offset stack in response to instructions from the decoder and controller and to convert a dummy received address to the respective selected address for control input to the read only memory.

14. A device according to claim 13 in which the read only memory is a programmable read only memory.

15. A device according to claim 14 including means which, after the memory has been programmed, is changeable to a form in which the said replacement of selected addresses by the dummy address is operable.

16. A method of operating a program storage device for a computer, which provides output data including reference addresses, wherein at least some of those addresses which are within the device are changed prior to output to a dummy address and when received at the device the dummy address is changed back to the respective reference address.

17. A method according to claim 16 in which the device stores an offset derived from the difference between the dummy address and a respective reference address and uses the offset to reconstitute the respective reference address as required.

* * * * *